March 1, 1966 W. L. LINDLEY 3,237,667
SAFETY INSERT FOR TUBELESS TIRES
Filed April 20, 1964 3 Sheets-Sheet 1
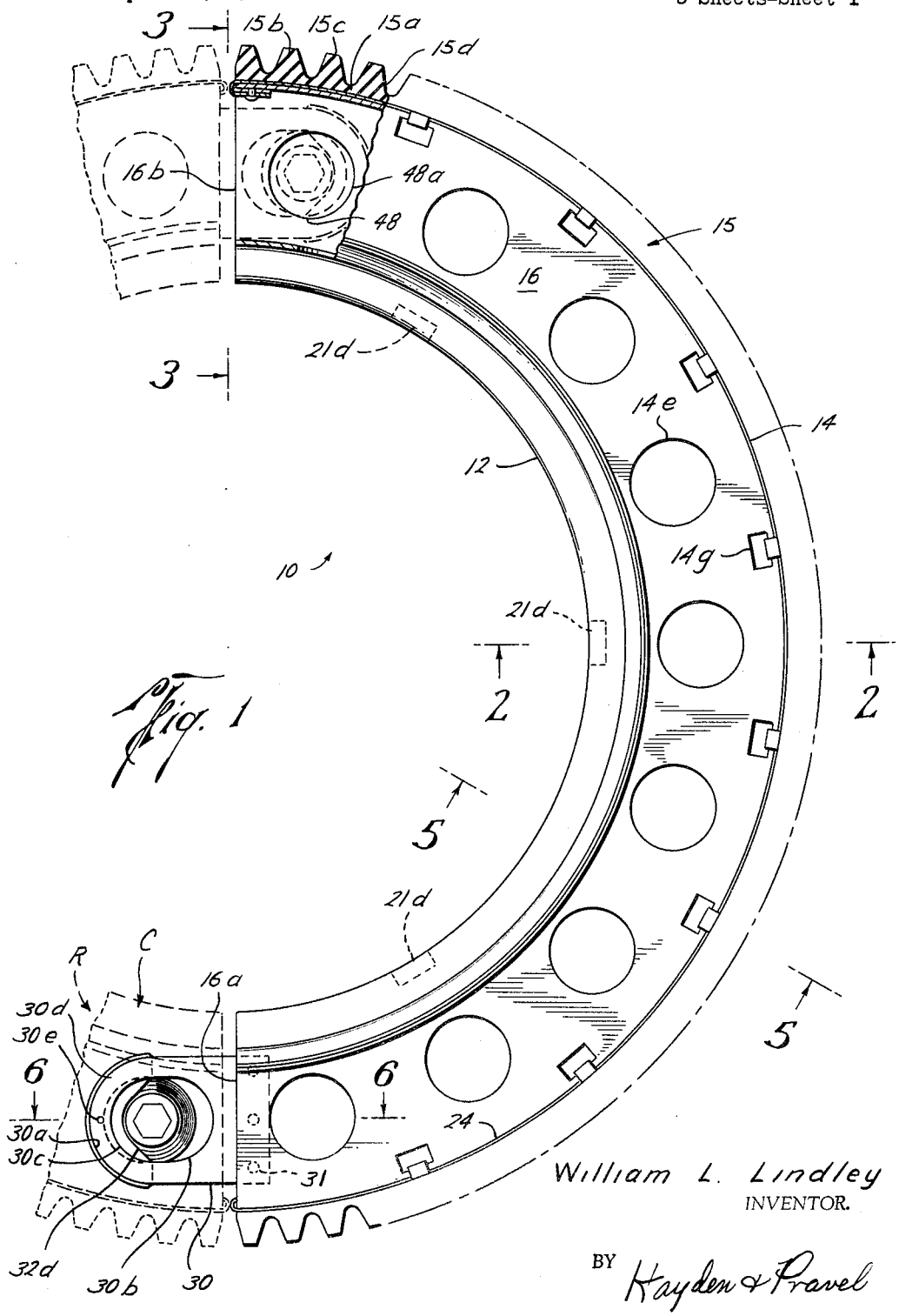
William L. Lindley
INVENTOR.
BY Hayden & Pravel
ATTORNEYS March 1, 1966 W. L. LINDLEY 3,237,667
SAFETY INSERT FOR TUBELESS TIRES
Filed April 20, 1964 3 Sheets-Sheet 2
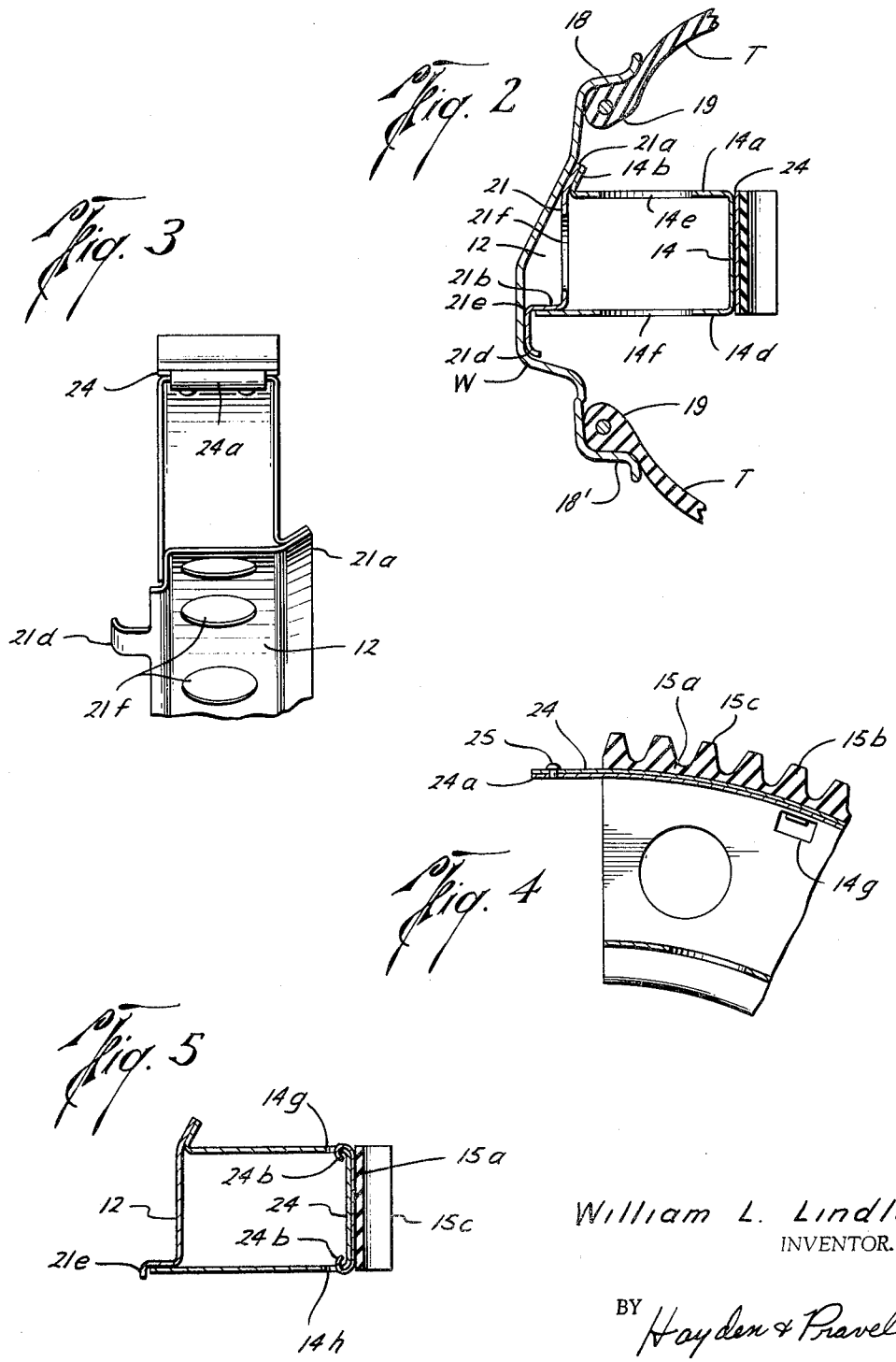
William L. Lindley
INVENTOR.
BY Hayden & Pravel
ATTORNEYS March 1, 1966 W. L. LINDLEY 3,237,667
SAFETY INSERT FOR TUBELESS TIRES
Filed April 20, 1964 3 Sheets-Sheet 3

William L. Lindley
INVENTOR.

BY Hayden & Pravel
ATTORNEYS

United States Patent Office 3,237,667
Patented Mar. 1, 1966

3,237,667
SAFETY INSERT FOR TUBELESS TIRES
William L. Lindley, P.O. Box 13183, Houston, Tex.
Filed Apr. 20, 1964, Ser. No. 360,944
9 Claims. (Cl. 152—158)

This invention relates to a safety insert for tubeless tires and more particularly to a safety insert to be positioned about the wheel of a vehicle within a tubeless tire mounted on the wheel which reequires no alteration or modification of the wheel or tire to receive benefit from the safety insert which supports the vehicle when the tire loses normal air pressure.

The present invention is an improvement on the inventions disclosed in the prior copending applications bearing Serial Nos. 150,262 and 242,986 filed November 6, 1961 and December 7, 1962, respectively, now Patent No. 3,142,326 and Patent No. 3,141,490

As disclosed in the above-mentioned patent applications, a load-bearing structure may be inserted or positioned within the carcass of a tubeless tire about the wheel to thereby provide a load bearing structure for supporting the weight of the vehicle on which the tire is mounted as a means of permitting sustained operation of the vehicle should the tire lose normal air pressure and to also provide safety from dangerous swerving, skidding and lurching to enable the operator of the vehicle to maintain control. With a view of enabling sustained operation on a deflated tire without damaging the tire as often occurs when the deflation is excessive, this invention contemplates a plurality of radially-extending projections adapted to contact the inner surface of the tread portion of the tire on deflation to thereby inhibit damage to the structure of the tire.

Additionally, the structure of this invention provides means for solving problems yet unsolved in terms of providing a safety insert for tubeless tires. Many devices known in the prior art have included arcuate portions which are mounted or attached to the wheel of the vehicle to extend radially outwardly to thereby provide a structural support holding the wheel off the roadway. Such devices are mounted by nuts and bolts or other attaching means connected through the drop center portion of the wheel to require alteration of the structure of the wheel resulting in a permanent installation connected to each wheel. Such installation permanently alters the wheel and limits placement of the safety insert in other vehicles, such as a new vehicle purchased by the owner, at the expense of throwing away or disposing of the old wheel. The perforations associated with the attaching means leave the wheel useless for all intents and purposes so that the owner of safety inserts known in the prior art is faced with the dilemma of disposing of the altered wheels and replacing them if he desires to keep possession of the inserts for a newer model car; on the other hand, the owner is faced with the economic burden of buying new inserts should he decide that the expense of replacing the wheels on his older vehicle is unjustifiable. Further, it might be appreciated that tubeless tires maintain internal air pressure only when the tire and the wheel and the juncture therebetween are leakproof so that the forming of holes and other openings in the wheel make it somewhat difficult to maintain appropriate air pressure with the tire.

The mounting means including drilled holes for receiving bolts or the like known in the prior art provide centering for the devices heretofore known and further, sufficiently held such devices against rotation should the operator of the vehicle drive some distance on the wheel with a deflated tire. This invention provides means for securing a plurality of arcuate portions in an encircling manner about the drop center portion of the wheel without drilling or otherwise altering the structure of the wheel thereby risking the likehood of leaks and further destroying the value of the wheel. The invention is particularly adapted to be secured about a wheel to extend radially outwardly thereof in a central plane relative to the wheel and the tubeless tire without slipping relative to the tubeless tire or wheel.

It has been discovered that driving a vehicle with a deflated tire subjects the tire to cuts and bruises resulting from the weight of the vehicle acting on the wheel at the point of contact with the tire when the wheel is sitting on the roadway. An additional point worthy of mention is that driving on a deflated tire even with a safety insert or other similar structure positioned about the rim additionally subjected the tire to harm and possible destruction. This arises from the fact that, during rotation, the tire must move at a greater linear velocity than the rim of the wheel which has a smaller radius of rotation about the axle. When one chooses to drive on a partially deflated tire, the tire is deformed near the point of contact with the roadway and pushed back toward the rim of the wheel and thereby rotates at the same velocity. When a tire is fully deflated, the weight of the vehicle acting on the wheel pinches the sidewalls and tread portion of the tire carcass between the rim and the ground to thereby limit the instantaneous velocity of that portion of the tire relative to the axle of the vehicle to the same velocity of the rim. Therefore, such contact tends to retard the velocity of the tire due to the fact, in each revolution, the tread portion of the tire must travel materially further in terms of linear velocity than the rim and yet is restricted in velocity when each portion of the tire passes between the edges of the rim and the roadway. The natural resiliency of the material of which most tubeless tires are formed tends to enable the structure of the tire to pass through the point of contact with the roadway by bunching or doubling up to consequently feed the tire past the point of contact at a greater velocity. It may be appreciated that the bunching up of the tire carcass involves the folding or wrinkling of the tire which has a detrimental effect on it. Tires are constructed to be yieldable and pliable but no manufacturer ever contemplated folding the tire to the extent of actually creasing the tire at the fold. Therefore, it is usually deleterious to drive any distance on a deflated tire with a safety rim absent means for safely feeding wrinkles or folds of the tire carcass past the point of contact with the roadway without damage.

This invention includes a rubber strip having outwardly extending serrations which is attached to a plurality of arcuate portions forming an encircling, load bearing safety insert for a tubeless tire. Such means enable the operator of the vehicle to drive for unlimited distances on a deflated tire without damaging the tire due to the fact that the structure of the above-mentioned means enables the tire to feed past the point of contact with the roadway without flexing or wrinkling. Further, to avoid the danger of wearing the serrations off the safety insert, and thereby re-encountering the danger inherent in driving on a deflated tire supported by a safety insert, this invention may be assembled and disassembled with a new serrated strip to thereby continue the protection of the safety inserts of this invention to both the vehicle and its contents and the tubeless tire mounted thereabout and avoid damage to the tire over a long period of time. Such means therefore enables the purchaser of the safety rim of this invention to utilize it indefinitely not subject to permanent attachment to the wheels of any particular vehicle and additionally not subject to the wear to which the invention often encounters during its contemplated usage.

An object of this invention is to provide a new and improved safety insert for tubeless tires formed of arcuate portions adapted to be connected together in the drop center portion of a wheel having a tubeless tire mounted thereabout to thereby position a load bearing, serrated surface in spaced relation to the tread portion of the tubeless tire to support the vehicle when the tire loses normal air pressure to thereby altogether alleviate the danger of lurching, skidding and swerving.

An important object of this invention is to provide a new and improved safety insert for tubeless tire including arcuate portions which are connected together to position the safety insert in the drop center of the wheel centered with respect to the sidewalls of the tubeless tire and the rims of the wheel, the centering being accomplished on installation by contracting spacing means against the wheel to position the safety insert.

Yet another object of this invention is to provide a new and improved repairable safety insert for tubeless tires which supports a vehicle when the tubeless tire mounted on the wheel loses air pressure by structurally bracing the inner surface of the tread portion of the tubeless tire without damaging the tire wherein the contact is made by a yieldable serrated surface which feeds the tire through the contact with the roadway in "bunches" to equalize the linear velocities of the safety insert and the tire and thereby avoid damage to the tire.

A further object of this invention is to provide a new and improved repairable safety insert having a yieldable serrated surface in which the serrations are formed on metal members having lock tabs along their length and releasable means at opposite ends which engage and disengage the arcuate portion of the safety insert and are removable therefrom for replacement when worn.

An additional object of the present invention is to provide a new and improved safety insert for tubeless tires which is adapted to be placed about the wheel of a vehicle in the tubeless tire to protect the vehicle and contents from dangers resulting from loss of air pressure, said insert being installed and used without requiring any alteration of the wheel or tire.

An important object of the present invention is to provide a new and improved safety insert for tubeless tires formed of arcuate portions which connect together forming a load bearing structure encircling the vehicular wheel drawn tightly thereabout by operation of the connecting means to thereby prevent movement of the safety insert from its position on the wheel.

Yet another object of this invention is to provide a new and improved safety insert for tubeless tires which is mounted or dismounted on vehicular wheels without use of special tools and requiring no holes or alterations and which is assembled and disassembled by use of hand tools.

Other objects and advantages of the present invention will become more apparent after a reading of the following specification and examination of the enclosed drawings wherein:

FIG. 1 is a side view of one of two identical semicircular arcuate portions forming the safety insert of this invention;

FIG. 2 is a sectional view taken along the line 2—2 of FIG. 1 illustrating the relationship of the encircling, load bearing structure of the safety insert relative to the drop center portion of the wheel and the tubeless tire;

FIG. 3 is a sectional view taken along the line 3—3 of FIG. 1 illustrating one end of an arcuate portion of the safety insert of this invention;

FIG. 4 is an internal view of the closed channel forming the structure of the safety insert of this invention illustrating the relationship of the channel and the detachable serrated surface;

FIG. 5 is a sectional view taken along the line 5—5 of FIG. 1 illustrating one means of securing the radially extending serrations to the load bearing structure of the invention;

Figure 6:
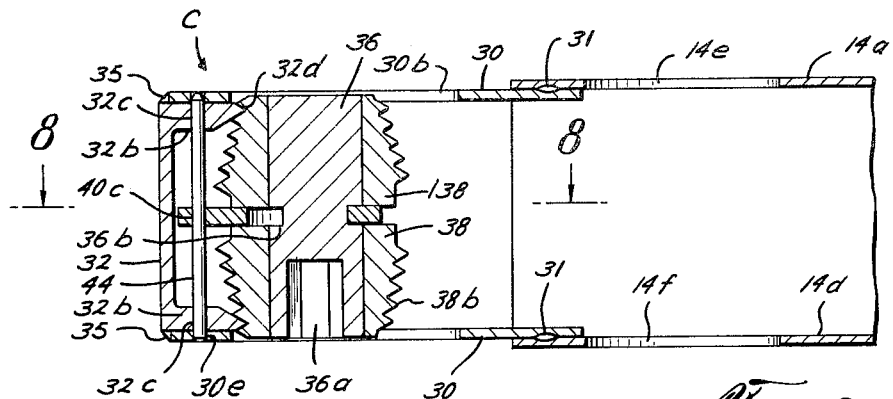
FIG. 6 is a sectional view taken along the line 6—6 of FIG. 1 illustrating the connecting means enabling connection of a plurality of arcuate segments together.

In the drawings, the numeral 10 indicates generally one segment of the safety insert of this invention having a base 12 adapted to seat against the drop center of a tire wheel W and a load bearing member 14 spaced apart from the base 12 by structural means designated generally at 16. A yieldable, serrated member 15 is positioned exteriorly of the member 14 and is adapted to contact and support the inner surface of the tread portion of a tubeless tire on deflation. The preferred embodiment of the invention includes two semicircular segments 10 which are secured together about the wheel W of the vehicle by interconnection of the connecting means indicated at C with the receiving means R. Each identical segment 10 of the preferred embodiment includes such means at each end and it may be appreciated that the segments are interconnected to form an encircling, load bearing structure for supporting a vehicle on a deflated tire without damaging the tire to thereby permit the vehicle operator to drive without fear of blowouts or other tire damage and the consequential loss of vehicular control.

Considering the invention in more detail, FIG. 2 illustrates in section the wheel W having a pair of beaded, outwardly extending rims 18 and 18' which circumferentially abut a tire T at its beads 19. The base 12 of the insert 10 is illustrated as including a structural member 21 as having a contoured shoulder 21a placed in contact with the wheel W. The member 21 is additionally bent at 21b to extend perpendicularly toward the wheel W to position a spaced tab or ear 21d in the depressed central portion of the wheel W extending thereacross to contact the wheel W at its change of contour. The spacer means 21d are illustrated in FIG. 1 at various locations to contact the wheel W and do not extend continuously about the wheel W which structure is additionally illustrated in FIG. 5.

The load bearing support 10 of this invention is preferably in the form of a box channel and is illustrated in FIG. 2 with the three additional sides of the box channel formed of one piece of material. The walls of the load bearing member 14 extend perpendicularly thereof and the upper wall 14a illustrated in FIG. 2 is contacted against the base structural member 21 and carries a flange 14b thereon shaped to seat against the angularly positioned shoulder 21a of the base 12. The lower wall 14d is contacted against the base plate 21 and rests on the curled lip 21e in contact with the wheel W. The two curved structural members of which the load bearing structure of the safety insert 10 are fashioned are joined together by appropriately spaced spot welds or other attaching means at the flanges 21a and 14b and also on the inwardly extending shoulder 21b. Of course, other means for assembling the portions of the safety insert may be used.

The walls 14a and 14d are lightened or reduced in weight by including spaced holes 14e and 14f, respectively, about the semicircular portion 10 and, additionally, the base plate 21 includes several holes illustrated at 21f in FIG. 2 with such holes located about the safety insert of this invention at spaced intervals.

The rectangular box channel of the insert and the contoured base 12 are arcuately shaped to form a segment of the safety insert of this invention extending up to 180 degrees circumferentially of the wheel W and are illustrated from a varied point of perspective in FIG. 3 to further accent the means for positioning the invention relative to the wheel W. Specifically, FIG. 3 shows the shoulder 21a which extends outwardly in contact with the wheel W and, on the opposite side of the box channel, the spaced tab 21d is illustrated for aligning the safety insert. The base 12 of the insert is further shown in FIG. 3 as being arcuately shaped which fact is pointed up by the elliptical nature of the lightening holes 21f shown in the base plate member 21.

The load bearing member 14 is carried in spaced relation to the wheel W and the tire T by the box channel support means 16 and may be used to directly contact the inner surface of the tread portion of the tire T if desired. However, as mentioned hereinbefore, the contacting of a smooth unyielding surface, without more against the tire T on deflation tends to destroy the tire T by wrinkling and folding the tire T on rotation resulting from the fact that the tire T is badly deformed and pinched between the safety insert and the roadway. The resilient means 15 illustrated in FIG. 1 are further illustrated in FIGS. 2–5 wherein said resilient means is fixed or otherwise secured to an arcuate backing member 24. The member 24 extends the full length of the load bearing member 14 and somewhat therebeyond at 24a to thereby provide a portion which is bent over and under the end of the box channel as a means of securing each end of the resilient means 15 to the safety insert 10. A rivet 25 or other appropriate attaching means is used to fasten the portion 24a to the underside of the load bearing support 14 as shown in FIG. 1 and it may be appreciated that such connections are utilized at each end of the segment 10. The backing member 24 additionally includes at spaced locations outwardly extending locking tabs 24b adapted to be bent under the member 14 thereby obtaining proper alignment of the resilient means 15 about the full circumference of the safety insert. Rectangular openings 14g and 14h are formed in the sides of the box channel 16 immediately adjacent the support member 14 for receiving the lock tabs 24b therein as is shown in FIG. 5.

The resilient means 15 includes a continuous base portion 15a extending the full length of the backing member 24 and regularly spaced, outwardly extending rubber teeth 15b are formed integrally of the base portion 15a. The rubber teeth 15b include a relatively narrow crown 15c and have a widening base 15d at the continuous portion 15a to thereby provide structurally sound resilient means for contacting the inner surface of the tubeless tire T. The rubber teeth 15b are deployed with their crowns 15c extending perpendicularly to the plane of FIG. 1 so that, on insertion in a tubeless tire, the support provided by the teeth for a deflated tire in contact with the roadway passes bunched up portions of the tire through the point of contact during rotation to thereby prevent damage to the tire as will be discussed in more detail hereinafter.

The safety insert segment 10 illustrated in FIG. 1 is connected to an identical segment 10, partially illustrated in dotted line, to thereby form an encircling, load bearing structure adapted to protect a vehicle during operation from blowouts and to further enable operation of the vehicle on partially deflated tires without damage. While the preferred embodiment includes two segments extending 180 degrees of the wheel W, the means for securing the segments to one another are preferably identical and repetitive in that any number of segments may be thereby secured utilizing the same securing means. The connecting means C of FIG. 1 is carried by a pair of mounting brackets 30 which are spot welded at 31 to the support means 14a and 14d of the safety insert 10. The brackets 30 extend outwardly of the end opening 16a of the box channel structure 16 and terminate at a semicircular edge 30a. An oval hole 30b is formed in the bracket 30 with one arcuate portion 30c being concentric with the curved surface 30a for about 180 degrees of curvature to define a rounded flange 30d between the two above-mentioned concentric curves. A small guide hole 30e is located on the flange 30d and is aligned with a similar opening in the mounting bracket positioned immediately behind the bracket 30.

The space between the mounting brackets 30 is spanned by a connector guide 32 having a semicylindrical shell 32a and including semicircular end members 32b which interiorly abut the semicircular flanges 30d carried on the outer end of the mounting brackets 30. A hole 32c is formed in each of the semicircular end portions 32b and the inner surface of the end members 32b is shaped to form a sharp curved guide 32d resembling screw threads. The edge 32d is illustrated in FIG. 1 as somewhat hyperbolic in curvature as will be discussed in more detail hereinafter. However, it may be appreciated at this juncture point that the curved lip 32d threadedly engages and guides the connecting means to be described. The connector guide 32 is secured to the mounting brackets 30 by welding fillets 35 or by other appropriate means.

Figure 7:
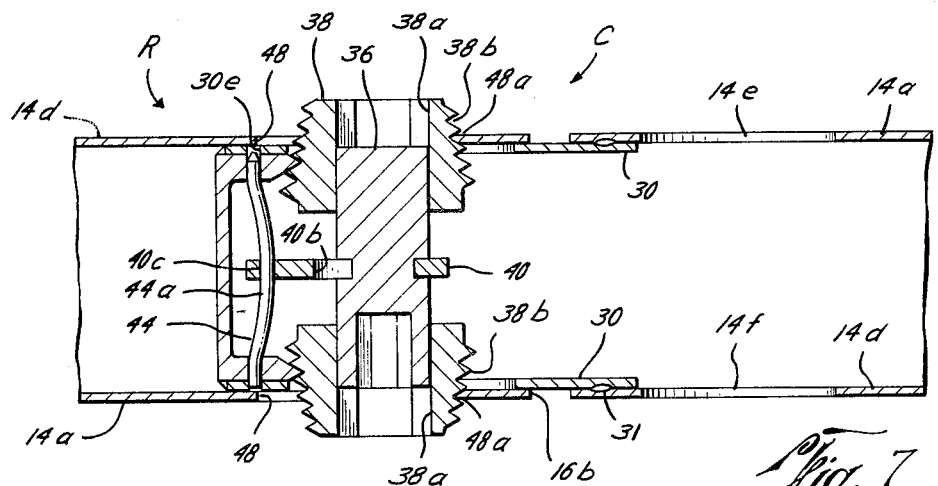
FIG. 7 is a sectional view similar to FIG. 6 in which the connecting means are engaged with one end of another arcuate segment.

A hexagonal mounting shaft 36 between the mounting brackets is spaced from the end opening 16a of the safety insert 10 as shown in FIG. 6 and a pair of similar, continuously threaded cones 38 and 138 are adapted to be placed on the shaft 36 by means of the axially extending holes 38a in each of the cones. A continuous thread designated generally at 38b is formed on the exterior sloping surface of the cones 38 and 138 so that threaded engagement therewith by the guide lip 32d generates movement of each cone on the mounting shaft 36 on rotation. It may be appreciated that the cones 38 and 138 are illustrated in FIG. 6 in the fully retracted position prior to interconnection of two or more segments 10 of the safety insert of this invention and that the cones are identical except for being threaded in opposite directions thereby causing equal extension from the retracted position of FIG. 6 on rotation of the shaft 36 and the cones 38 and 138, which are effectively keyed to the shaft because of the shape of the shaft 36 and the cooperating hexagonal holes of the cones. Such movement is illustrated in FIG. 7.

Figure 8:
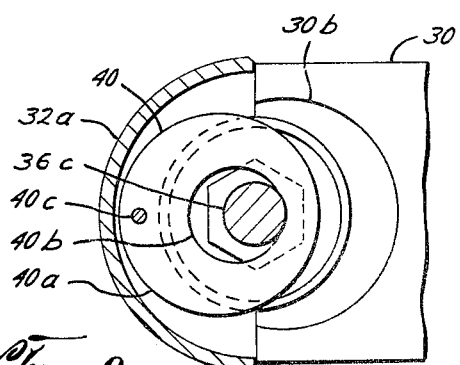
FIG. 8 is a sectional view taken along the line 8—8 of FIG. 6 providing further details of the connecting means of this invention.

The shaft 36 is formed with an axial opening 36a which is preferably of a dimension appropriate for receiving a standard sized Allen wrench therein as a means of imparting rotation of the shaft 36. The shaft 36 includes an annular groove 36b extending fully thereabout near its midpoint defining a small neck 36c which is circular in cross-section as shown by FIG. 8 which is a sectional view taken through the connecting means C. The neck 36c provides means for receiving one edge of an off-center washer 40 or shaft support fitted in the annular groove 36b. The off-center washer includes a circular outer edge 40a and a circular opening 40b which is off-center with respect to the washer 40 and a small hole 40c is formed near the outer edge 40a of the washer. The hole 40c is carried by alignment of the shaft support 40 in the annular groove 36b and positioned in alignment with the holes 30e in the brackets 30 and the holes 32c formed in the connector guide 32. A straight, springy pin 44 is passed through the aligned holes and is held at one end in the position illustrated in FIG. 6 by any appropriate means.

The pin 44 aligns the shaft support 40 and thereby restricts movement or play of the threaded cones 38 and 138 mounted on the hexagonal shaft 36. Thus, FIG. 6 illustrates the cones 38 and 138 in the retraction position, withdrawn between the mounting brackets 30, and held in contact with the screw thread edge 32d of the connector guide 32. On rotation of the hexagonal mounting shaft 36, the tapered cones 38 and 138 threadedly engage the edge 32d of the connector guide 32 and move therepast on continued rotation to alter the spacing between the connected guide 32 and the shaft 36. Such movements of the tapered portions of the cones 38 and 138 relative to the connector guide 32 shifts the narrow neck 36c of the shaft relative to the end 44 and thereby deflects the pin 44 at 44a to maintain the cones 38 and 38a in spring loaded contact with the thread edge formed on the guide connector 32.

The tapered cones 38 and 138 are shown in the retracted position in FIG. 6 and are adapted to extend outwardly of the oval opening 30b on rotation of the hexagonal mounting shaft. FIG. 7 illustrates the position of the oppositely threaded tapered cones 38 and 138 along the shaft 36 and further includes structural details of the receiving means R of an adjacent segment of the safety insert of this invention. The receiving means R of this invention preferably is formed in one end of each segment 10 immediately adjacent the open end 16b of the channel structure 16 which carries the load bearing member 14 in spaced relation to the wheel W. Thus, the opposite walls 14a and 14d of the support means include identical holes or openings 48 (which may be identical to the lightening holes 14e and 14f). In FIG. 7, the receptacles or holes 48 formed in the sidewall members 14a and 14d are positioned in axial alignment with the shaft 36 allowing the smaller, outer ends of the tapered cones 38 and 138 to feed therethrough on rotation. Rotation of the shaft 36 carries the threads 38b into contact with an arcuate portion 48a positioned diametrically opposite the threaded edge 32d of the connector guide 32, such engagement operating in the same manner to move the cones 38 and 138 longitudinally of the shaft 36 past the edges 48a on rotation. It is to be noted that the arcuate portions 48a nearer the open end 16b of the box channel engage the cones 38 and 138 so that continued rotation of the shaft 36 positions an ever-broadening section of the tapered cones 38 and 138 between the connector guide 32 and the receiving means R of this invention. It may be appreciated that rotation to the full extension of the tapered cones 38 and 138 draws the connecting means C on the mounting brackets 30 fully within the opening end 16b of the coacting segment 10 of the safety insert and thereby draws the segments closer together resulting in a unitary load bearing structure fully encircling the wheel W.

In operation, the safety insert of this invention is inserted segment by segment into the tubeless tire T positioned on the wheel W before the beads 19 of the tire are seated against the rims 18 and 18'. The segments are rested against the drop center portion of the wheel W and are aligned so that the connecting means C of each segment extends interiorly of the end of the channel 16 of the adjacent segment with the cones 38 and 138 in the retracted position of FIG. 6. Thus, if two segments are used as is illustrated in the preferred embodiment, the arrangement of FIG. 1 is satisfactory for installing a safety insert of this invention about the wheel W within the tubeless tire T. Access to the Allen wrench socket 36a of the connecting means is easily obtained since the tire T has not yet been seated with respect to the rims 18 and 18' to form the required pressure seal necessary for the operation of the tubeless tires. An Allen wrench is inserted in the hole 36a and is rotated to extend the tapered cones 38 and 138 through the holes 48 and to draw the ends of the two segments towards one another. Rotation is continued until the cones are moved between the threaded edge 32d of the connector guide 32 and the edge 48a of the hole 48 to urge the two ends of the segments toward one another achieving a spacing such as is illustrated in FIG. 1 at the completion of rotation of the hexagonal mounting shaft 36. The above-mentioned connecting routine is performed on both the connecting means C carried by the two segments of the preferred embodiment to complete installation of the safety insert of this invention.

Of importance is the fact that the progressive tightening or snugging up of the segments of the insert results in alignment of the safety insert of this invention with the wheel W by seating the base 12, and in particular, the flange 21a and the spaced alignment ears 21d relative to the drop center portion of the wheel W to thereby align the load bearing structure of this invention at all points about the wheel W. It may be appreciated from a view of FIG. 2 that such alignment is easily achieved without extensive effort and more particularly, it is achieved without utilization of specially constructed mounting means, holes or the like. In further particular, the safety insert which is tightly drawn about the wheel W is therafter fixed against rotation relative to the wheel W and is held firmly in place throughout the time of the installation.

When the cones 38 and 137 are fully extended and the segments of the safety insert are drawn together, the pin 44 spring loads the cones to maintain them in alignment in the illustrated position of the drawings by applying a spring force through the shaft support 40 to the shaft 36 to position the shaft 36 and limit its movement. On the other hand, the spring pin 44 and the washer 40 also hold the connecting means C in contact with the threads 32d formed on the connector guide 32 when the cones 38 and 138 are retracted as shown in FIG. 6. Such retention is found desirable in that the threaded outer surface of the cone is maintained in coacting relationship with the threaded edge 32d at all times, even in the retracted position. The shaft support 40 rides in the annular groove 36b about the circular neck 36c of the shaft 36 and is not rotated therewith by the hexagonal outer surface which is effectively keyed to the cones 38 and 138.

After installation of the safety insert of this invention in the tubeless tire T, the vehicle on which the tire is mounted may be used with immunity from the danger of tire blowouts and from the inconvenience of flat tires and changing same. When the tire T loses its normal air pressure and materially deforms at the point of contact with the roadway, the resilient means 15 is contacted against the inner surface of the tread portion at the point of contact wtih the surface and provides structural support to thereby prevent damage to the tire and to the rims of the wheel W should the vehicle operator continue to drive. The crown portion 15c of the rubber teeth contacts the tire and cushions it against the effects of pinching between the unyielding roadway and load bearing element 14. On rotation of the point of contact with the roadway relative to the tire, the yieldable means 15 is effective to pass bunches of the tire through the point of contact without damage resulting from utilization of the safety insert. If perchance, the resilient means 15 should become torn, destroyed, or worn from usage, such means may be removed from the safety insert and replaced. Disassembly is accomplished by removal of the rivets 25 at each end of the resilient means and disengagement of the clips 24b which are folded under the support member 14. Assembly of new resilient means is accomplished by positioning the backing member 24 on the support member 14 and folding over the extending ends 24a and connecting them to the lower side of the backup member 14 by the attaching means 25. The ears 24b are bent to engage the rectangular openings 14g and 14h to clip the backup member 24 in place at spaced locations along tis full length.

Briefly, this invention relates to a safety insert providing means protecting against the dangers of tire blowouts and means further permitting continued operation on deflated tires without damage thereto, said means adapted to be positioned on a wheel without connection thereto and without requiring drilling or other permanent alteration of the wheel and yet achieving and maintaining such installation without relative rotation between the safety insert and tire.

What is claimed is:

1. A safety insert adapted to be positioned on a wheel of a vehicle in a tubeless tire in contact with a roadway, comprising:

(a) an encircling load bearing structure formed of a plurality of segments, said segments adapted to be seated against a wheel at any desired arcuate portion thereof;

(b) connecting means carried on one end of each segment for connecting the segments together;

(c) receiving means on the remaining ends of the segments for coacting with the connecting means to connect the segments in an encircling structure;

(d) means for positioning the load bearing structure in spaced relation to the inner surface of the tread portion of the tire to support the vehicle when the tubeless tire becomes deflated;

(e) means carried on the load bearing structure for contacting the inner surface of the tread portion of the tire;

(f) said last named means also being adapted to pass the tubeless tire through the point of contact with the roadway when the vehicle is moving without damage to the tire; and (g) wherein said load bearing structure is secured against rotation relative to the wheel when said plurality of segments is positioned thereabout by said connecting and receiving means.

2. A safety insert as set forth in claim 1 wherein the load bearing structure includes:

(a) a base portion shaped to seat against the drop center portion of the wheel;

(b) an encircling load bearing member;

(c) support means connected to the base to position the member radially outwardly of the base and inwardly of the tubeless tire to support the tire on partial deformation at its point of contact with the roadway.

3. A safety insert as set forth in claim 1 wherein the receiving means and connecting means secure the safety insert against rotation about the wheel.

4. A safety insert as set forth in claim 1 wherein the positioning means includes spaced means adapted to contact and seat against the wheel.

5. A safety insert as set forth in claim 1 wherein the last named means includes a yieldable, serrated surface.

6. A safety insert as set forth in claim 3 wherein said means operate without alteration of the wheel.

7. A safety insert for a vehicle utilizing tubeless tires comprising:

(a) an encircling load bearing structure formed of a plurality of segments;

(b) connecting means carried on one end of each segment for connecting the segments together;

(c) receiving means on the remaining ends of the segments for coacting with the connecting means to connect the segments in an encircling structure;

(d) said load bearing structure, when assembled of said segments, positioning a load bearing member between the sidewalls of the tire and between the drop center of the wheel and the tread portion of the wheel;

(e) resilient means carried by the load bearing member interiorly of the tread portion of the tire to yieldingly support the tire on deflation;

(f) said resilient means passing the tire through the point of contact with the roadway on rotation without damage; and (g) said connecting and receiving means constituting the sole means for securing said safety insert in the tubeless tire.

8. A safety insert for wheel-mounted tubeless tires comprising:

(a) a load bearing structure including:
   (1) a base shaped to fit between the rims of a wheel;
   (2) said base being contoured to conform to the wheel and further adapted to be positioned at any point about the wheel;
   (3) a load bearing member;
   (4) support means connected to the base to position the load bearing member in spaced relation to the wheel and tubeless tire;

(b) said load bearing structure being formed of arcuate segments having two ends each;

(c) coacting means carried by the ends of said segments for connecting said segments together about the wheel;

(d) resilient means;

(e) releasable means for securing the resilient means to the load bearing member to extend circumferentially about the wheel; and (f) said coacting means connecting said segments tightly about the wheel whereby said load bearing structure is fixed relative to the wheel.

9. An insertable and removable tire safety device adapted for use with a wheel and tubeless tire without modification comprising:

(a) an encircling load bearing structure formed of a plurality of segments sufficient to extend about a wheel;

(b) a base on said structure adapted to be contacted against the wheel at any point about the circumference thereof and between the rims thereof;

(c) coacting means carried on the ends of said structure segments for connecting same together into said load bearing structure; and (d) said coacting means adapted to draw said segments together and further constituting means for securing said load bearing structure against relative rotation about the wheel.

References Cited by the Examiner

UNITED STATES PATENTS

| | | | |
|---|---|---|---|
| 1,860,362 | 5/1932 | Jones | 152—158 |
| 2,097,748 | 11/1937 | Von Bon Horst | 152—158 |
| 2,241,858 | 5/1941 | Hruska | 152—158 |

ARTHUR L. LA POINT, *Primary Examiner.*